(12) United States Patent
Mainini

(10) Patent No.: US 8,185,345 B2
(45) Date of Patent: May 22, 2012

(54) DEVICE AND METHOD TO MONITOR CONSUMABLES CONSUMED BY ANIMAL

(75) Inventor: Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 629 days.

(21) Appl. No.: 12/335,233

(22) Filed: Dec. 15, 2008

(65) Prior Publication Data
US 2009/0187349 A1 Jul. 23, 2009

Related U.S. Application Data

(60) Provisional application No. 61/022,072, filed on Jan. 18, 2008.

(51) Int. Cl.
*G01G 19/00* (2006.01)
*A01K 5/00* (2006.01)
(52) U.S. Cl. ............... 702/173; 702/174; 119/51.01
(58) Field of Classification Search .............. 702/19, 702/173, 174, 101
See application file for complete search history.

(56) References Cited

U.S. PATENT DOCUMENTS

| 6,659,039 | B1 * | 12/2003 | Larsen | 119/51.02 |
| 2001/0011527 | A1 * | 8/2001 | Ulman et al. | 119/51.01 |
| 2006/0201433 | A1 * | 9/2006 | Kates | 119/51.02 |
| 2007/0137584 | A1 * | 6/2007 | Travis | 119/51.02 |
| 2008/0252464 | A1 * | 10/2008 | Panasevich | 340/573.1 |
| 2009/0250012 | A1 * | 10/2009 | Greene et al. | 119/417 |

* cited by examiner

*Primary Examiner* — Hal Wachsman
(74) *Attorney, Agent, or Firm* — Pitts & Lake, P.C.

(57) ABSTRACT

Described is a consumption monitoring device for monitoring the amount of consumables consumed by an animal during a monitoring period. More specifically, the consumption monitoring device measures the weight of the consumables, which are contained within a receptacle, and detects any change in the weight, such as when additional consumables are placed within the receptacle or when the animal consumes all or some of the consumables. The device calculates various values based on these changes in weight, at least one of which indicates the amount of consumables consumed by the animal. The device displays this calculated value such that the user is informed of the amount of consumables consumed by the animal within the monitoring period. This information assists the user in maintaining the animal on a desired feeding program.

26 Claims, 4 Drawing Sheets

DEVICE AND METHOD TO MONITOR CONSUMABLES CONSUMED BY ANIMAL

CROSS-REFERENCE TO RELATED APPLICATIONS

This application claims the benefit of U.S. Provisional Application No. 61/022,072, filed Jan. 18, 2008.

STATEMENT REGARDING FEDERALLY SPONSORED RESEARCH OR DEVELOPMENT

Not Applicable

BACKGROUND OF THE INVENTION

1. Field of the Invention

This invention pertains to a device for monitoring the amount of food and/or other consumables consumed by an animal.

2. Description of the Related Art

Animal obesity, especially in pets, has become a developing problem. Statistics indicate that between 10% and 40% of pets seen by veterinarians are overweight or obese. Animal medicine has indicated that the condition of obesity is a precursor to a number of health problems for animals, and veterinarians are actively working to reduce the occurrence of this condition in animals. Additionally, Pfizer Animal Health recently announced that the Food and Drug Administration (FDA) approved SLENTROL® (dirlotapide), a drug used in the safe and effective management of canine obesity, making the drug the first and only veterinary-approved obesity drug for dogs in the United States. In other efforts to combat animal obesity, animal food manufacturers have introduced a number of "lite" animal foods that are intended to be used in combination with feeding and exercise programs. Additionally, there is an extensive number of websites dedicated to feeding programs based on animal types, breeds, and sizes.

Despite the above-discussed efforts, animal obesity is still a problem and still on the rise. One of the primary reasons for the failure of the above-discussed feeding programs is that the animal's owners do not adhere to the parameters of the program. Further, the owner's lack of adherence is not due to lack of intent or will on the owner's part, but is largely unintentional. For example, in a multi-person household, each person is likely to fill a pet's food bowl when it is empty, assuming that the pet has not been fed. Or, conversely, each person may refrain from filling the pet's food bowl with the thought that the pet has already been fed. Accordingly, the problem is that each person in the household is not aware of whether the pet has been fed. Additionally, each person is unaware of how much food the pet has consumed within a given time period. This lack of conveyance of information relating to the animal's feeding activities is the primary cause of the above-discussed lack of adherence to the feeding program. Consequently, a device that indicates the amount of food consumed by an animal during a given time period is desired.

BRIEF SUMMARY OF THE INVENTION

In accordance with the various features of the present invention there is provided a consumption monitoring device for monitoring the amount of consumables, such as animal food, consumed by an animal during a monitoring period. The consumption monitoring device includes a receptacle support, a weight measuring device, a processor, and a display. The receptacle support is adapted to receive a receptacle such that the weight of the receptacle, and any contents thereof, is applied against the receptacle support. The receptacle is adapted to contain the consumables such that when the receptacle is received by the receptacle support, the consumables are accessible by the animal. The weight measuring device is adapted to measure the weight applied against the receptacle support. As a result, the weight measuring device measures the weight of the receptacle and the consumables contained therein. The processor is in electrical communication with the weight measuring device such that the weight measuring device indicates the currently measured weight to the processor. When the processor detects a change in the measured weight, the processor defines a first measured weight and a second measured weight. A change in the measured weight can be the result of, for example, additional consumables being added to the receptacle or the animal removing consumables from the receptacle for consumption. The first measured weight is the measured weight just prior to the detected change in measured weight, and the second measured weight is the measured weight after the change. The processor calculates a current consumption value, a total consumption value, and a consumables available value based on the first measured weight and the second measured weight. More specifically, when the first measured weight is greater than the second measured weight, the processor calculates the current consumption value, which is based on the difference between the first measured weight and the second measured weight. The total consumption value is the sum of the current consumption values calculated within the monitoring period. The consumables available value is based on the second measured weight. As a result, the total consumption value indicates the amount of consumables consumed by the animal within the monitoring period, and the consumables available value indicates the amount of consumables currently contained within the receptacle. After the processor calculates the values, it activates the display to display the values such that the values are perceivable by a user.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
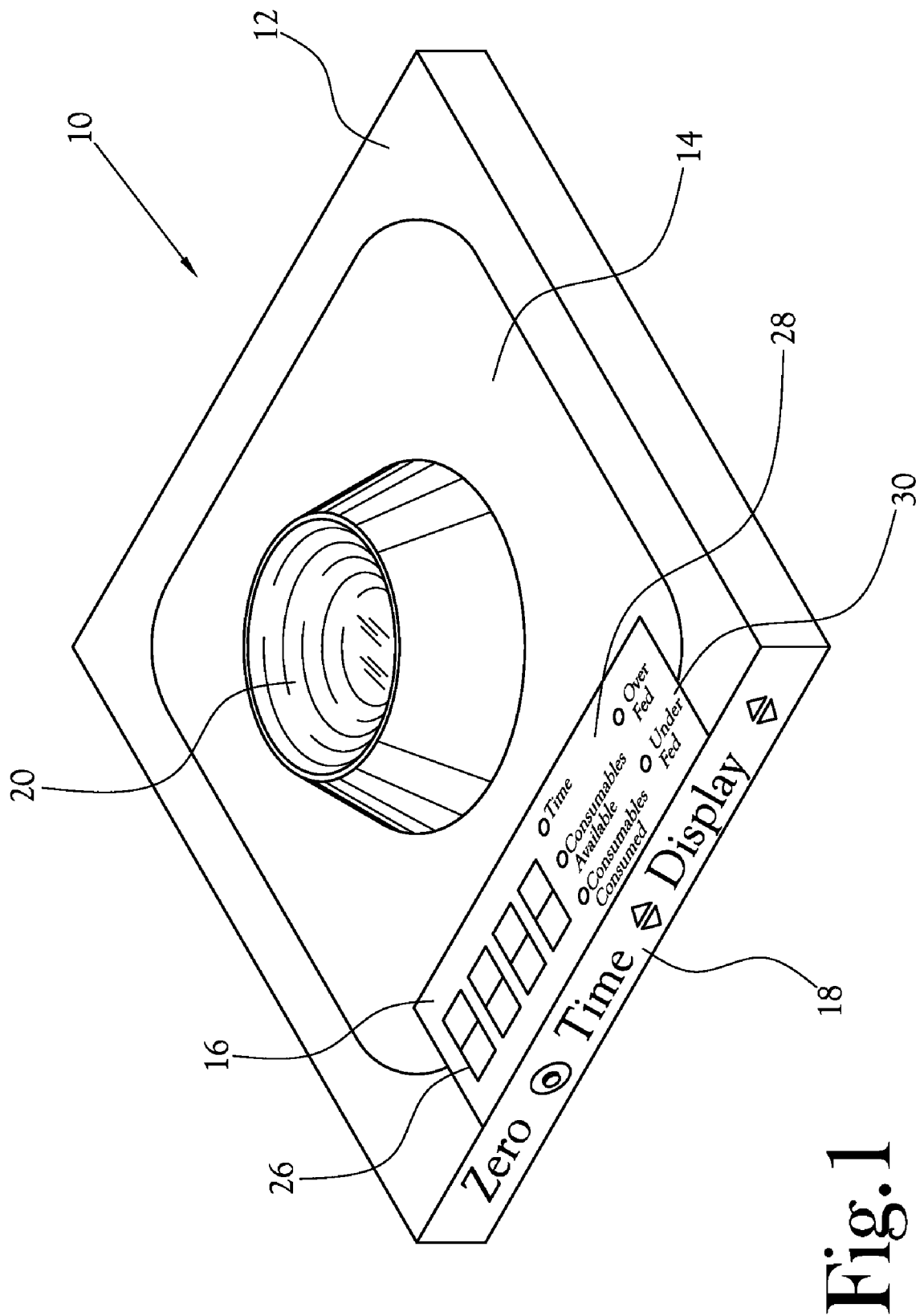
FIG. 1 illustrates one embodiment of the consumption monitoring device in accordance with the various features of the present invention.

The present invention provides a consumption monitoring device for monitoring the amount of consumables, such as animal food, consumed by an animal during a monitoring period. More specifically, the consumption monitoring device measures the weight of the consumables, which are contained within a receptacle, and detects any change in the weight, such as when additional consumables are placed within the receptacle or when the animal consumes some or all of the consumables. The device calculates various values based on these changes in weight, at least one of which indicates the amount of consumables consumed by the animal. The device displays this calculated value such that the user is informed of the amount of consumables consumed by the animal within the monitoring period. This information assists the user in maintaining the animal on a desired feeding program. One embodiment of the consumption monitoring device constructed in accordance with the various features of the present invention is illustrated generally at 10 in FIG. 1.

The consumption monitoring device 10 includes a base 12, a receptacle support 14, a display 16, and user controls 18. The base 12 structurally supports the receptacle support 14, the display 16, and the user controls 18 and houses various electrical circuitry and a processor 24 (not shown in FIG. 1). The receptacle support 14 receives and mechanically supports a receptacle 20 such that the weight of the receptacle 20 is applied against the receptacle support 14. In the illustrated embodiment, the receptacle support 14 is a platform and the receptacle 20 is positioned on the receptacle support 14 such that the receptacle support 14 mechanically supports the receptacle 20. It should be noted that the receptacle support 14 can mechanically support the receptacle 20 by ways other that illustrated and discussed above without departing from the scope or spirit of the present invention. For example, in one embodiment, the receptacle support 14 can be such that the receptacle 20 hangs from the receptacle support 14. It should also be noted that the receptacle 20 can be removably secured to the receptacle support 14 without departing from the scope or spirit of the present invention. Further, it should be noted that the receptacle 20 can be an integrated component of the receptacle support 14 without departing from the scope or spirit of the present invention.

The receptacle 20 is adapted to receive, contain, and present consumables such that the animal can access the consumables from the receptacle 20 when the receptacle 20 is received by the receptacle support 14. The consumables include anything consumable by the animal, such as animal food, water, and medications.

Figure 2:
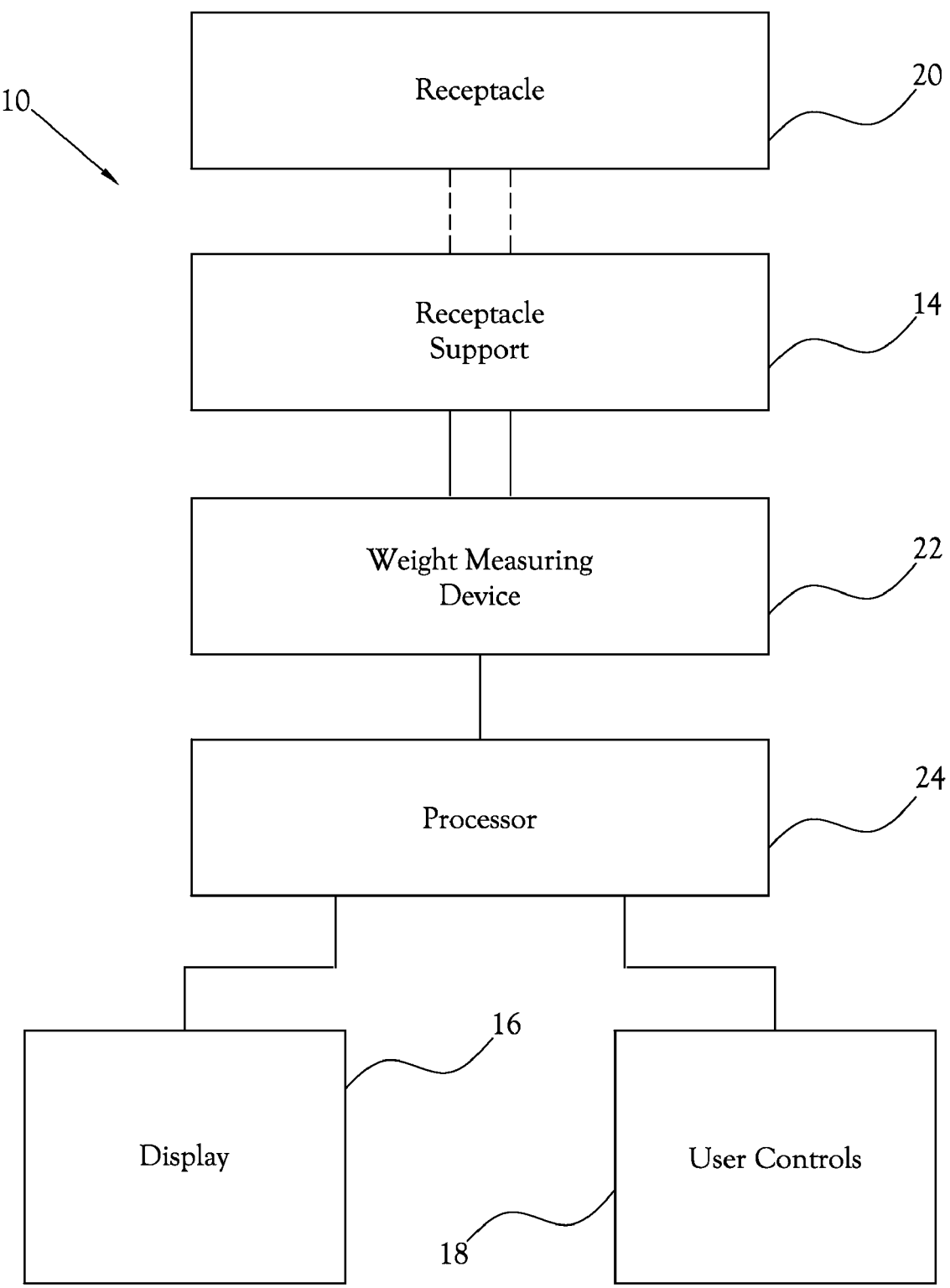
FIG. 2 is a block diagram of one embodiment of the consumption monitoring device of FIG. 1.

FIG. 2 is a block diagram of one embodiment of the consumption monitoring device 10 in accordance with the various features of the present invention. In the illustrated embodiment, the consumption monitoring device 10 includes the receptacle support 14, a weight measuring device 22, a processor 24, the display 16, and the user controls 18. The weight measuring device 22 is in mechanical communication with the receptacle support 14 and in electrical communication with the processor 24. The weight measuring device 22 measures the weight applied against the receptacle support 14. In one embodiment, the weight measuring device 22 is a scale, such as a strain gage. However, it should be noted that the weight measuring device 22 can be any device adapted to measure the weight applied against the receptacle support 14.

In accordance with the above discussion, when the receptacle 20 is received by the receptacle support 14, the weight measuring device 22 measures the weight of the receptacle 20 and any consumables contained therein. The weight measuring device 22 generates a weight measurement, which is indicative of the weight applied against the receptacle support 14 as measured by the weight measuring device 22. The processor 24 receives the weight measurement and calculates various values relating to the animal's consumption of the consumables.

Figure 3:
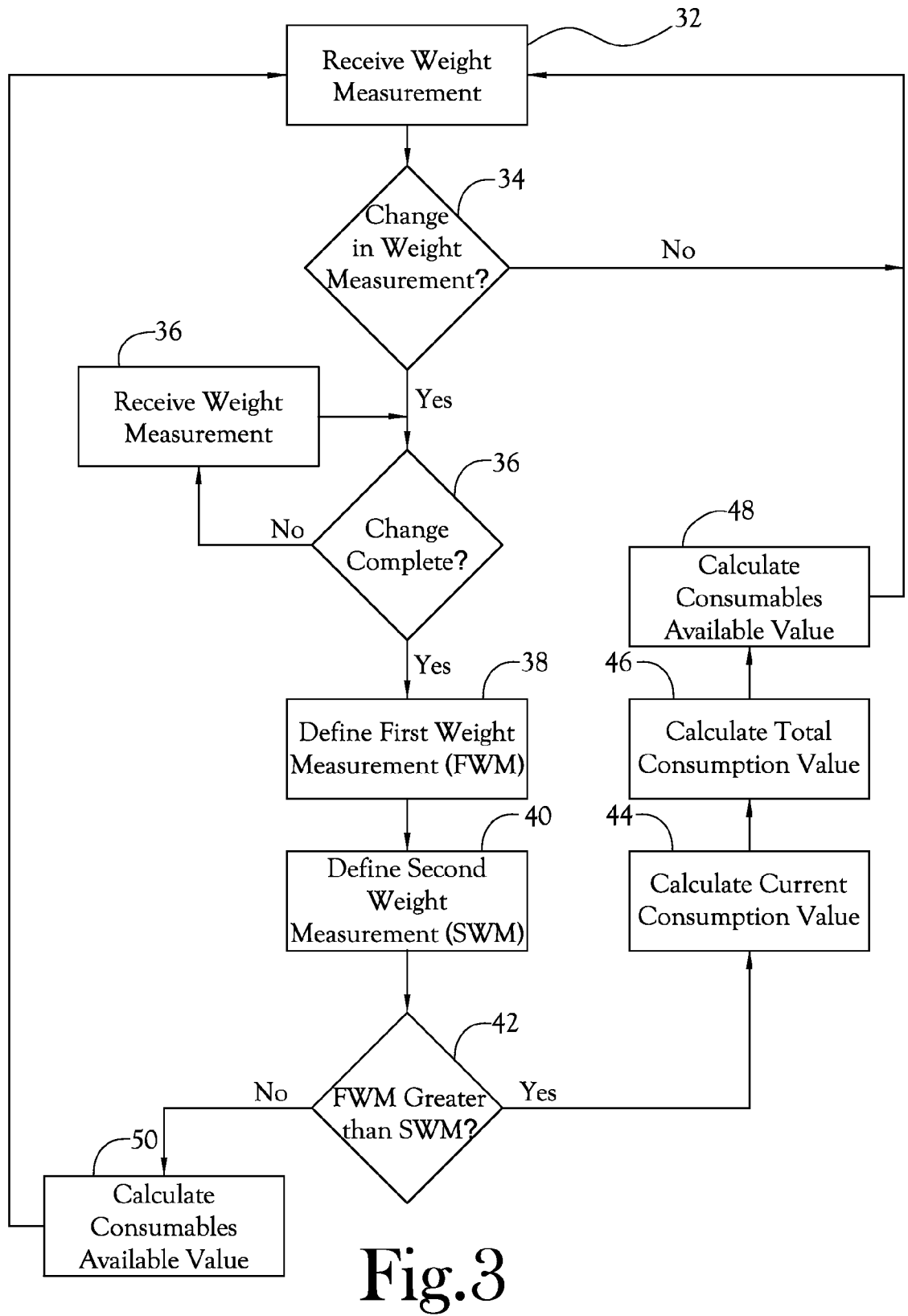
FIG. 3 is a flow diagram illustrating the operation of the processor of one embodiment of the consumption monitoring device.

FIG. 3 is a flow diagram illustrating the operation of the processor 24 of one embodiment of the consumption monitoring device 10 in accordance with the various features of the present invention. As discussed above and illustrated at 32, the processor 24 receives the weight measurement generated by the weight measuring device 22. Also in accordance with the above discussion, the weight measurement indicates the amount of consumables contained within the receptacle 20. The processor 24 is adapted to detect any change in the weight measurement, as illustrated at 34. A change in the weight measurement is indicative of a change in the weight applied against the receptacle support 14. This change can be the result of various occurrences. For example, when consumables are added to the receptacle 20, the weight at the receptacle support 14 will increase. Additionally, when consumables are consumed by the animal, that is, removed from the receptacle 20, the weight at the receptacle support 14 will decrease. When the processor 24 detects a change in the weight measurement, it first determines when the change is complete, as illustrated at 36. For example, when consumables are first added to the receptacle 20 or when the animal presses against the receptacle 20 to consume consumables contained therein or when the animal accidentally exerts a force against the receptacle support 14, the weight at the receptacle support 14, as measured by the weight measuring device 22, fluctuates continuously for a brief period of time. This continuously fluctuating weight results in a continuously fluctuating weight measurement, which is not useful in calculating subsequently discussed values. As a result, the processor 24 does not process the change in the weight measurement until the weight measurement stops fluctuating for a predefined period of time, such as ten seconds. Stated differently, after the processor 24 detects the initial change in the weight measurement and determines that the weight measurement has since been consistent for the predetermined period time, the processor 24 determines that the change in the weight measurement is complete.

When the processor 24 determines that the change in the weight measurement is complete, the processor 24 defines a first weight measurement and a second weight measurement, as illustrated at 38 and 40, respectively. The first weight measurement is the weight measurement just before the processor 24 detected the change. The second weight measurement is the weight measurement when the processor 24 determines the change is complete. Next, the processor 24 determines whether the first weight measurement is greater than the second weight measurement, as illustrated at 42. The first weight measurement being greater than the second weight measurement indicates that the animal consumed some or all of the consumables contained within the receptacle 20. The first weight measurement being less than the second weight measurement indicates that the user placed additional consumables within the receptacle 20.

When the first weight measurement is greater than the second weight measurement, the processor 24 calculates a current consumption value, as illustrated at 44. The current consumption value is the magnitude of the difference between the first weight measurement and the second weight measurement. Accordingly, the current consumption value indicates the amount of consumables consumed by the animal at its most recent feeding. Next, the processor 24 calculates a total consumption value, as illustrated at 46. The total consumption value is the combined value or the sum of the current consumption values calculated within the current monitoring period. Accordingly, the total consumption value indicates the amount of consumables consumed by the animal since the initiation of the current monitoring period. After calculating the total consumption value, the processor 24 calculates the consumables available value 48. The consumables available value is the second weight measurement. Accordingly, the consumables available value indicates the amount of consumables currently contained within the receptacle 20. After calculating the consumables available value, the processor 24 returns to receiving the weight measurement, as illustrated at 32.

When the first weight measurement is less than the second weight measurement, the processor 24 calculates the consumables available value, as illustrated at 50. After calculating the consumables available value, the processor 24 returns to receiving the weight measurement, as illustrated at 32.

It should be noted that the consumption values and the consumables available value can be in terms of the actual weights as measured and indicated by the weight measuring device 22, as is the case in the above-discussed embodiment, or the values can be in other terms based on these weights. For example, the values can be converted into units that are more user friendly without departing from the scope or spirit of the present invention.

The monitoring period is the period of time within which the processor 24 calculates the total consumption value. State differently, the total consumption value indicates the amount of consumables consumed by the animal within the monitoring period. Accordingly, when the monitoring period is terminated/initiated, the current consumption value and the total consumption value are set zero. The monitoring period can be initiated and/or terminated manually or automatically. When the monitoring period is manually terminated/initiated, the user operates a control provided by the user controls 18 to accomplish such. As a result, when the user operates the control, the consumption values are set to zero. When the monitoring period is automatically terminated/initiated, the processor 24 maintains a clock. The monitoring period can be set to terminate/initiate at a defined time of day or after a defined period of time. For example, the monitoring period can be set to terminate/initiate at midnight. Accordingly, the processor 24 resets the consumption values to zero at midnight every day. As a result, the total consumption value always indicates the amount of consumables consumed by the animal during the current day.

Considering again FIG. 2, the display 16 and the user controls 18 are in electrical communication with the processor 24. The display 16 and the user controls 18 provide an interface between the user and the consumption monitoring device 10. More specifically, the display 16 presents at least the total consumption value. In the illustrated embodiment of FIG. 1, the display 16 includes a seven-segment digit display 26, a corresponding information indicator 28, and a consumption status indicator 30. The digit display 26 provides information in accordance with the information indicator 28, which, in the illustrated embodiment, includes a "Time" indicator, a "Consumables Available" indicator, and a "Consumables Consumed" indicator. In the illustrated embodiment, each of the indicators of the information indicator 28 is an LED. In accordance with above discussion, when the "Time" indicator 28 is illuminated, the digit display 26 presents the current time; when the "Consumables Available" indicator 28 is illuminated, the digit display 26 presents the consumables available value; and when the "Consumables Consumed" indicator 28 is illuminated, the display 26 presents the total consumption value.

The consumption status indicator 30 indicates when the animal has consumed either more or less consumables than are permitted by a given feeding program. For example, the user enters an upper consumption threshold and a lower consumption threshold into the processor 24 by way of the user controls 18. The upper consumption threshold defines the upper limit of consumables the animal can consume and remain in compliance with the feeding program. The lower consumption threshold defines the lower limit of consumables the animal must consume to remain in compliance with the feeding program. Accordingly, in the illustrated embodiment, the consumption status indicator 30 includes an "Over Fed" indicator and an "Under Fed" indicator, each indicator being an LED. When the processor 24 determines that the total consumption value is greater than the upper consumption threshold, the processor 24 illuminates the "Over Fed" indicator, indicating to the user that the animal has consumed more than is permitted by the feeding program. When the processor 24 determines that the total consumption value is less than the lower consumption threshold, the processor 24 illuminates the "Under Fed" indicator, indicating to the user than the animal has not yet consumed enough within the current monitoring period to remain in compliance with the feeding program.

It should be noted that the components of the display 16 can vary in number and type from those illustrated and discussed above without departing from the scope or spirit of the present invention. For example, the display 16 can include an LED or an LCD display and can include various indicators other than those illustrated and discussed above.

The user controls 18 enable the user to adjust various settings of the consumption monitoring device 10 and to govern the current output of the display 16. In the illustrated embodiment, the user controls 18 include a "Zero" switch, a "Time" control, and a "Display" control. The "Time" control 18 enables the user to set the current time to be kept by the processor 24 and presented by the display 16. The "Display" control 18 enables the user to select the information that is presented at the digit display 16, the selected information being indicated by the information indicator 28. For example, in the illustrated embodiment, the "Display" control 18 is a pair of buttons that enable the user toggle through the various information presented by the display 16. When the user desires the digit display 26 to present the current time, the user operates the "Display" control 18 until the "Time" indicator 28 is illuminated. As discussed above, when the "Time" indicator 28 is illuminated, the digit display 26 presents the current time. Similarly, when the user desires the digit display 26 to present the amount of consumables currently contained by the receptacle 20, the user operates the "Display" control 18 until the "Consumables Available" indicator 28 is illuminated. As discussed above, when the "Consumables Available" indicator 28 is illuminated, the digit display 26 presents the consumables available value. Additionally, when the user desires the digit display 26 to present the amount of consumables consumed by the animal within the current monitoring period, the user operates the "Display" control 18 until the "Consumables Consumed" indicator 28 is illuminated. As discussed above, when the "Consumables Consumed" indicator 28 is illuminated, the display 26 presents the total consumption value. It should be noted that the user controls 18 can vary in number and type from those illustrated and discussed above without departing from the scope or spirit of the present invention.

Figure 4:
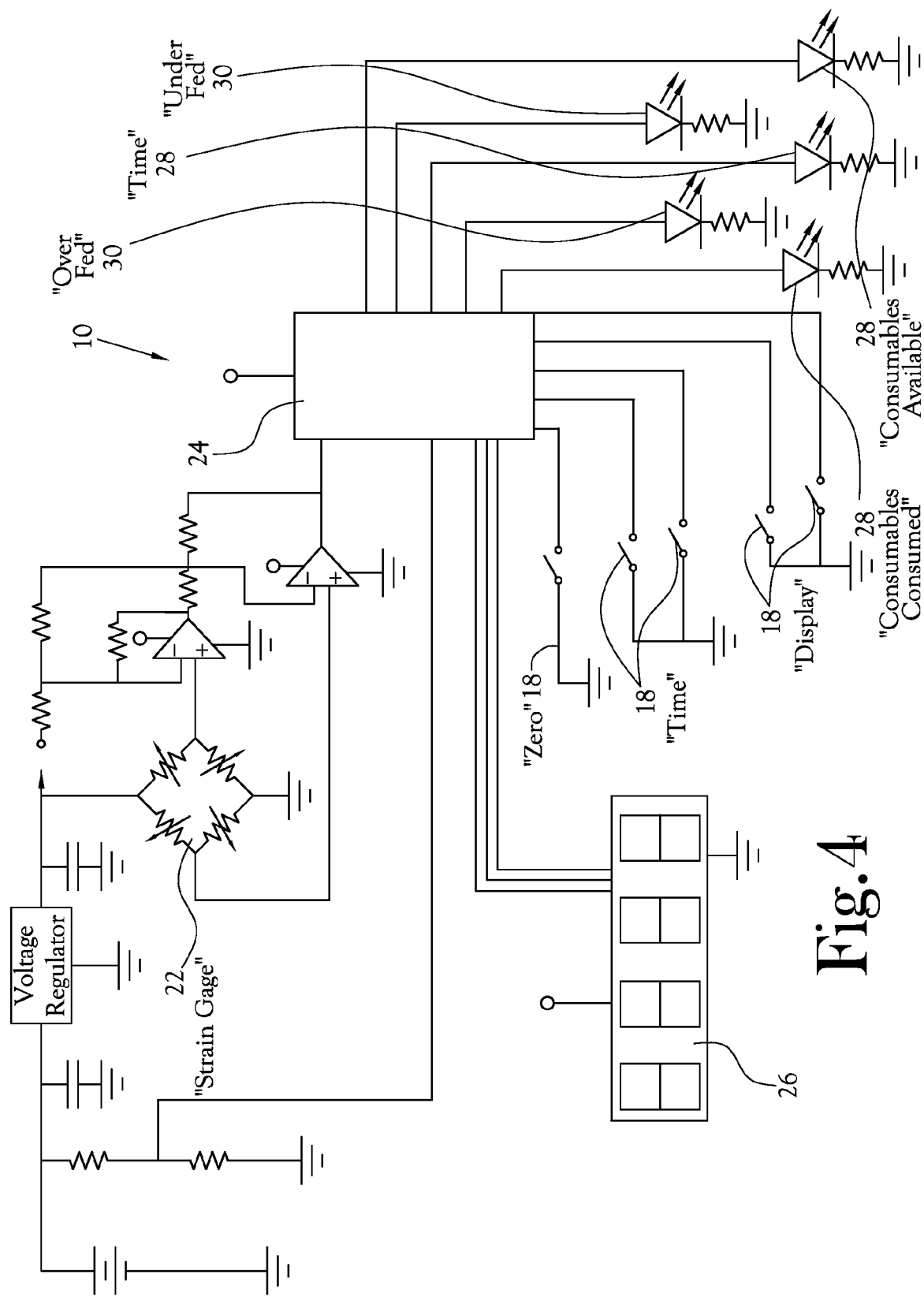
FIG. 4 is a schematic diagram of one embodiment of the consumption monitoring device.

FIG. 4 is a schematic diagram illustrating one embodiment of the consumption monitoring device 10 in accordance with the various features of the present invention. It should be noted that the schematic of FIG. 4 is for exemplary purposes only and that the electrical components of the illustrated embodiment can vary without departing from the scope or spirit of the present invention.

Considering the above discussion, the operation of one embodiment of the consumption monitoring device 10 is initiated by the user adjusting certain settings within the processor 24 using the user controls 18. For example, in the illustrated embodiment of FIG. 1, the user adjusts the current time, the monitoring period, the upper consumption threshold, and the lower consumption threshold. For the purpose of the following discussion, the monitoring period is set be a twenty-four hour period of time automatically terminating/initiating at midnight. Additionally, in accordance with an animal feeding program, the upper consumption threshold is set to be fifteen units, and the lower consumption threshold is set to be five units. After adjusting the settings, the user calibrates the weight measuring device 22. More specifically, the user positions the empty receptacle 20 at the receptacle support 14, such that the receptacle support 14 receives the receptacle 20 in accordance with the above discussion. Then, in the illustrated embodiment, the user operates the "Zero" switch 18 while the receptacle 20 is received by the receptacle support 14. As a result, when the empty receptacle 20 is received by the receptacle support 14, the weight measurement is zero. When the weight measuring device 22 is calibrated, the user initiates the initial monitoring period. When the user initiates the initial monitoring period, the current consumption value and the total consumption value are set to zero.

After initiating the operation of the consumption monitoring device 10, the user places, for example, ten units of the consumables within the receptacle 20. The added consumables cause an increase in the weight measurement. Accordingly, in response thereto, the processor 24 recalculates the consumables available value to be ten and maintains the total consumption value at zero. Some time later, but still within the same monitoring period, the animal consumes seven units of the consumables. The consumption of consumables causes a decrease in the weight measurement. Accordingly, in response thereto, the processor 24 recalculates the consumables available value to be three and the recalculates the total consumption value to be seven. Later, but still within the same monitoring period, the user places an additional ten units of the consumables within the receptacle 20. In response to the corresponding change in the weight measurement, the processor 24 recalculates the consumables available value to be thirteen, and maintains the total consumption value at seven. Later, but still within the same monitoring period, the animal consumes ten additional units of the consumables. In response to the corresponding change in weight measurement, the processor 24 recalculates the consumables available value to be three and recalculates the total consumption value to be seventeen. Additionally, the processor 24 activates the "Over Fed" indicator 30 because the total consumption value is greater than the upper consumption threshold of fifteen units. Later, the time, as kept by the processor 24, moves to midnight. Accordingly, the processor 24 automatically terminates the previous monitoring period and initiates the next monitoring period by setting the total consumption value to zero and deactivating the "Over Fed" indicator 30.

In the discussed embodiment, when the user removes the receptacle 20 from the receptacle support 14, for example, to clean the receptacle, the weight measurement becomes a negative value and the processor 24 causes the display 16 to present an error message. When the receptacle 20 is replaced at the receptacle support 14, the user can recalibrate the weight measuring device 22 in accordance with the above discussion. Because the weight measuring device 22 is adapted to be calibrated each time the receptacle 20 is replaced at the receptacle support 14, the consumption monitoring device 10 is adapted to operate with various receptacles 20 such that the receptacle 20 is not limited to a specific structure or weight but includes any number of structures that are adapted to receive, contain, and present consumables such that the animal can access the consumables when the receptacle 20 is received by the receptacle support 14.

Considering the above-discussed exemplary embodiment of the consumption monitoring device 10, it is made clear that the processor 24 may maintain a current consumables available value and total consumption value even when the consumables are added to and removed from the receptacle 20 at various times throughout the given monitoring period. As a result, the user has access to information relating to the current amount of consumables currently within the receptacle 20 and the current amount of consumables consumed by the animal within the current monitoring period.

From the foregoing description, those skilled in the art will recognize that a consumption monitoring device for monitoring the amount of consumables consumed by an animal offering advantages over the prior art has been provided. More specifically, the consumption monitoring device measures the weight of the consumables, which are contained within a receptacle, and detects any change in the weight, such as when additional consumables are placed within the receptacle or when the animal consumes some or all of the consumables. The device calculates various values based on these changes in weight, at least one of which indicates the amount of consumables consumed by the animal. The device displays this calculated value such that the user is informed of the amount of consumables consumed by the animal within the monitoring period. This information assists the user in maintaining the animal on a desired feeding program.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A consumption monitoring device for monitoring the amount of consumables consumed by an animal, said consumption monitoring device comprising:

a receptacle support adapted to receive a receptacle, the receptacle being adapted to contain the consumables such that the consumables are accessible by the animal when the receptacle is received by said receptacle support, the collective weight of the receptacle and any consumables contained therein is applied against said receptacle support when the receptacle is received by said receptacle support;

a weight measuring device adapted to measure the weight applied against said receptacle support, said weight measuring device generates a weight measurement indicative of the measured weight;

a processor, in electrical communication with said weight measuring device, configured to receive and monitor the weight measurement, to define a first weight measurement and a second weight measurement in response to detecting a change in the weight measurement, the first weight measurement being the weight measurement just prior to the change, the second weight measurement being the weight measurement after the change, to calculate a current consumption value in response to the first weight measurement being greater than the second weight measurement, the current consumption value being based on the magnitude of the difference between the first weight measurement and the second weight measurement, and to calculate a total consumption value, the total consumption value being based on the sum of the current consumption values calculated within a monitoring period; and a display in electrical communication with said processor, said display being adapted to display the total consumption value.

2. The consumption monitoring device of claim 1 wherein said processor calculates a consumables available value, the consumables available value being based on the second weight measurement.

3. The consumption monitoring device of claim 2 wherein the consumables available value is the second weight measurement.

4. The consumption monitoring device of claim 1 wherein the current consumption value is the magnitude of the difference between the first weight measurement and the second weight measurement.

5. The consumption monitoring device of claim 1 wherein the second weight measurement is the weight measurement when the processor determines that the change is complete.

6. The consumption monitoring device of claim 5 wherein said processor determines that the change is complete when the weight measurement is consistent for a predefined period of time after the change.

7. The consumption monitoring device of claim 1 wherein said processor automatically terminates/initiates the monitoring period based on a predetermined time.

8. The consumption monitoring device of claim 7 wherein said processor resets the total consumption value to zero when the monitoring period is terminated/initiated.

9. The consumption monitoring device of claim 7 wherein the monitoring period is twenty-four hours.

10. The consumption monitoring device of claim 1 further comprising user controls in electrical communication with said processor.

11. The consumption monitoring device of claim 10 wherein the monitoring period is adjusted by way of the user controls.

12. The consumption monitoring device of claim 10 wherein the monitoring period is manually terminated/initiated by way of the user controls.

13. The consumption monitoring device of claim 12 wherein said processor resets the total consumption value to zero when the monitoring period is terminated/initiated.

14. The consumption monitoring device of claim 1 wherein said processor defines an upper consumption threshold, when the total consumption value is greater than the upper consumption threshold, the processor activates said display to indicate such.

15. The consumption monitoring device of claim 1 wherein said processor defines an lower consumption threshold, when the total consumption value is less than the lower consumption threshold, the processor activates said display to indicate such.

16. The consumption monitoring device of claim 1 wherein said weight measuring device is a strain gage.

17. The consumption monitoring device of claim 1 wherein said weight measuring device is adapted to be calibrated.

18. A consumption monitoring device for monitoring the amount of consumables consumed by an animal, said consumption monitoring device comprising:

a receptacle support adapted to receive a receptacle, the receptacle being adapted to contain the consumables such that the consumables are accessible by the animal when the receptacle is received by said receptacle support, the collective weight of the receptacle and any consumables contained therein is applied against said receptacle support when the receptacle is received by said receptacle support;

a weight measuring device adapted to measure the weight applied against said receptacle support, said weight measuring device generates a weight measurement indicative of the weight applied against said receptacle support;

a processor in electrical communication with said weight measuring device, said processor terminate/initiates a monitoring period, said processor being configured to receive and monitor the weight measurement, to define a first weight measurement and a second weight measurement in response to detecting a change in the weight measurement, the first weight measurement being the weight measurement just prior to the change, the second weight measurement being the weight measurement when said processor determines that the change is complete, to calculate a current consumption value in response to the first weight measurement being greater than the second weight measurement, the current consumption value being based on the magnitude of the difference between the first weight measurement and the second weight measurement, and to calculate a total consumption value, the total consumption value being based on the sum of the current consumption values calculated within the monitoring period, wherein said processor sets the total consumption value to zero in response to said processor terminating/itiniating the monitoring period, and calculates a consumables available value, the consumables available value being based on the second weight measurement; and a display in electrical communication with said processor, said display being adapted to display the total consumption value and the consumables available value.

19. The consumption monitoring device of claim 18 wherein said processor determines that the change is complete when the weight measurement is consistent for a predefined period of time after the change.

20. The consumption monitoring device of claim 18 wherein said processor automatically terminates/initiates the monitoring period based on a predetermined time.

21. A method of monitoring the consumption of consumables by an animal, whereby the consumables are contained within a receptacle, said method comprising:

defining, by a processor in electrical communication with a measuring device receiving the receptacle, a monitoring period to monitor the consumption of consumables by an animal;

measuring, by the measuring device, the weight of the consumables contained within the receptacle;

monitoring, by the processor, the measured weight;

in response to detecting a change in the measured weight, defining a first measured weight, the first measured weight being the measured weight just prior to the change, and defining a second measured weight, the second measured weight being the measured weight after the change;

calculating, by the processor, a current consumption value in response to the first measured weight being greater than the second measured weight, the current consumption value being based on the magnitude of the difference between the first measured weight and the second measured weight;

calculating, by the processor, a total consumption value, the total consumption value being based on the sum of the current consumption values calculated within the monitoring period; and displaying, on the measuring device, the total consumption value.

22. The method of claim 21 further comprising terminating/initiating the monitoring period by the processor.

23. The method of claim 22 further comprising setting, by the processor, the total consumption value to zero in response to said terminating/initiating.

24. The method of claim 21 further comprising calculating, by the processor, a consumables available value, the consumables available value being based on the second measured weight.

25. The method of claim 24 further comprising displaying, on a display, the consumables available value.

26. A consumption monitoring device for monitoring the amount of consumables consumed by an animal, comprising:

a receptacle support to receive a consumables receptacle configured to receive the consumables to be consumed by an animal;

a weight measuring device to generate a weight measurement of the weight applied against said receptacle support;

a processor to receive and monitor the weight measurement, to define a first weight measurement and a second weight measurement in response to detecting a change in the weight measurement, the first weight measurement being the weight measurement immediately prior to the change, the second weight measurement being the weight measurement after the change, to accordingly increase a consumables available value in response to the second weight measurement being greater than the first weight measurement, to accordingly decrease the consumables available value and calculate a current consumption value in response to the first weight measurement being greater than the second weight measurement, the current consumption value being the difference between the first weight measurement and the second weight measurement, and to calculate a total consumption value, the total consumption value being based on the sum of the current consumption values calculated within a monitoring period; and a display to display the total consumption value.

* * * * *